United States Patent [19]
Kato et al.

[11] Patent Number: 5,363,496
[45] Date of Patent: Nov. 8, 1994

[54] MICROPROCESSOR INCORPORATING CACHE MEMORY WITH SELECTIVE PURGE OPERATION

[75] Inventors: Rikako Kato; Hiroyuki Takai, both of Yokohama, Japan

[73] Assignee: Kabushiki Kaisha Toshiba, Kawasaki, Japan

[21] Appl. No.: 84,434

[22] Filed: Jun. 30, 1993

Related U.S. Application Data

[63] Continuation of Ser. No. 636,276, Dec. 31, 1990, abandoned.

[30] Foreign Application Priority Data

Jan. 22, 1990 [JP] Japan .................. 2-010667

[51] Int. Cl.$^5$ .................................. G06F 12/08
[52] U.S. Cl. .................. 395/425; 364/DIG. 1; 364/243.4; 364/243.42; 395/425
[58] Field of Search ... 364/200 MS File, 900 MS File; 395/425

[56] References Cited

U.S. PATENT DOCUMENTS

| | | | |
|---|---|---|---|
| 3,979,726 | 9/1976 | Lange et al. | 395/425 |
| 4,481,573 | 11/1984 | Fukunaga et al. | 395/400 |
| 4,701,844 | 10/1987 | Thompson et al. | 395/425 |
| 4,713,755 | 12/1987 | Worley, Jr. et al. | 395/375 |
| 4,719,568 | 1/1988 | Carrubba et al. | 395/425 |
| 4,811,215 | 3/1989 | Smith | 395/375 |
| 5,029,070 | 7/1991 | McCarthy | 395/425 |
| 5,091,846 | 2/1992 | Sachs et al. | 395/425 |
| 5,095,428 | 3/1992 | Walker et al. | 395/425 |
| 5,133,058 | 7/1992 | Jensen | 395/400 |
| 5,146,589 | 9/1992 | Peet, Jr. et al. | 395/575 |
| 5,165,028 | 11/1992 | Zulian | 395/400 |

FOREIGN PATENT DOCUMENTS

| | | |
|---|---|---|
| 86103433.8 | 3/1986 | European Pat. Off. |
| 0198231 | 10/1986 | European Pat. Off. |
| 2621407 | 4/1989 | France |
| 2210480A | 6/1989 | United Kingdom |

OTHER PUBLICATIONS

"Development of Tag Memory: MB81C51", A. Suzuki et al., Fujitsu Scientific & Technical Journal, vol. 25, No. 2, 1989, pp. 156–162.

Fujitsu Scientific and Technical Journal 25(1989) No. 2 pp. 156–162.

*Primary Examiner*—Joseph L. Dixon
*Assistant Examiner*—Matthew M. Kim
*Attorney, Agent, or Firm*—Foley & Lardner

[57] ABSTRACT

A microprocessor incorporating a cache memory with a selective purge operation includes a control register for storing control information including page information for controlling a purge operation for purging a predetermined page divided in the cache memory, a setting portion for transferring the control information to the control register; a comparator for comparing a target page address indicated by the control information stored in the control register with an address stored in the cache memory; and an issue portion for providing a purge command to indicate the start of execution of the purge operation to the comparator based on the control information stored in the control register only when the target page address agrees with an address in the cache memory.

7 Claims, 6 Drawing Sheets

FIG.3

| COMMAND NUMBER | CD | CE | SE | CC | EP | OPERATION |
|---|---|---|---|---|---|---|
| ① | * | 0 | * | * | * | CACHE MEMORY IS FALLEN INTO DISABLE STATE |
| ①' | 1 | 0 | * | * | * | DUMP OPERATION FOR CACHE IS EXECUTED AFTER OPERATION OF COMMAND ① IS FINISHED |
| ② | * | 1 | * | 1 | * | ALL PAGE IN CACHE ARE PURGED |
| ③ | * | 1 | * | 0 | * | DESIGNATED PAGE IN CACHE IS PURGED |
| ④ | * | 1 | 1 | * | * | SNOOP OPERATION IS EXECUTED |
| ⑤ | * | 1 | 0 | 0 | 0 | CACHE IS FALLEN INTO ENABLE STATE |

\* DON'T CARE

MICROPROCESSOR INCORPORATING CACHE MEMORY WITH SELECTIVE PURGE OPERATION

This application is a continuation of application Ser. No. 07/636,276, filed Dec. 31, 1990, now abandoned.

BACKGROUND OF THE INVENTION

1. Field of the Invention

This invention relates to a microprocessor including a cache memory therein, and more particularly so a microprocessor incorporating cache memory having a construction for efficiently executing a purge operation for purging a predetermined page divided for data stored in the cache memory.

2. Description of the Prior Art

In a conventional microprocessor including a cache memory, the cache memory has a method for purging only the whole information stored in the cache memory when a purge operation for information stored thereof is required.

Namely, only a part of the information stored in the cache memory can not be purged by the conventional cache memory. This type of cache memory therefore can be fully applicable into the microprocessor incorporating a small amount of the cache memory, for example having not more than 4K bytes. However, the conventional method can not be fully used in today's microprocessor including a cache memory having a large amount of capacity or scale.

For example, in the microprocessor incorporating with a larger scale cache memory, the whole information stored in the cache memory must be purged even when a purge operation for the part of the information is required.

Accordingly, the efficiency of the purge operation for the cache memory is low.

In other words, part of the information stored in the cache memory can not be deleted by using the ability of the conventional microprocessor. Namely, the conventional microprocessor can not execute any operation for purging a part of the cache memory.

Therefore when the purging operation for a part of the information is required, the operating efficiency of the entire microprocessor is decreased.

SUMMARY OF THE INVENTION

An object of the present invention is to provide a microprocessor incorporating a cache memory having an ability to purge any selected part of information, stored in the cache memory.

A microprocessor incorporating a cache memory according to the present invention, comprises the control register for storing the control information for controlling a purge operation per page for the cache memory, a setting means for setting the control information into the control register, a comparing means for comparing a target, address for the purge operation set in the control register with an address in the cache memory; and an issue means for issuing a command for the purge operation to the comparing means in accordance with the control information when the target address agrees with the address in the cache memory, wherein the comparing means transmits an instruction for the purge operation based on the command given from the issue means to the cache memory.

Thereby, in the purge operating of the microprocessor with a cache memory having a large scale capacity, the purge operation every page can be executed efficiently. We can get a larger effect when the microprocessor according to the present invention is used in today's general purpose microprocessor incorporating a cache memory having a large scale and capacity.

These and other objects, feature and advantages of the present invention will be more apparent from the following description of a preferred embodiment, taken in conjunction with the accompanying drawing.

BRIEF DESCRIPTION OF THE DRAWINGS

FIG. 3 is a diagram for comparison among commands in accordance with the control information;

DETAILED DESCRIPTION OF THE EMBODIMENTS

Embodiments of the invention will be described with reference to diagrams.

Figure 1:
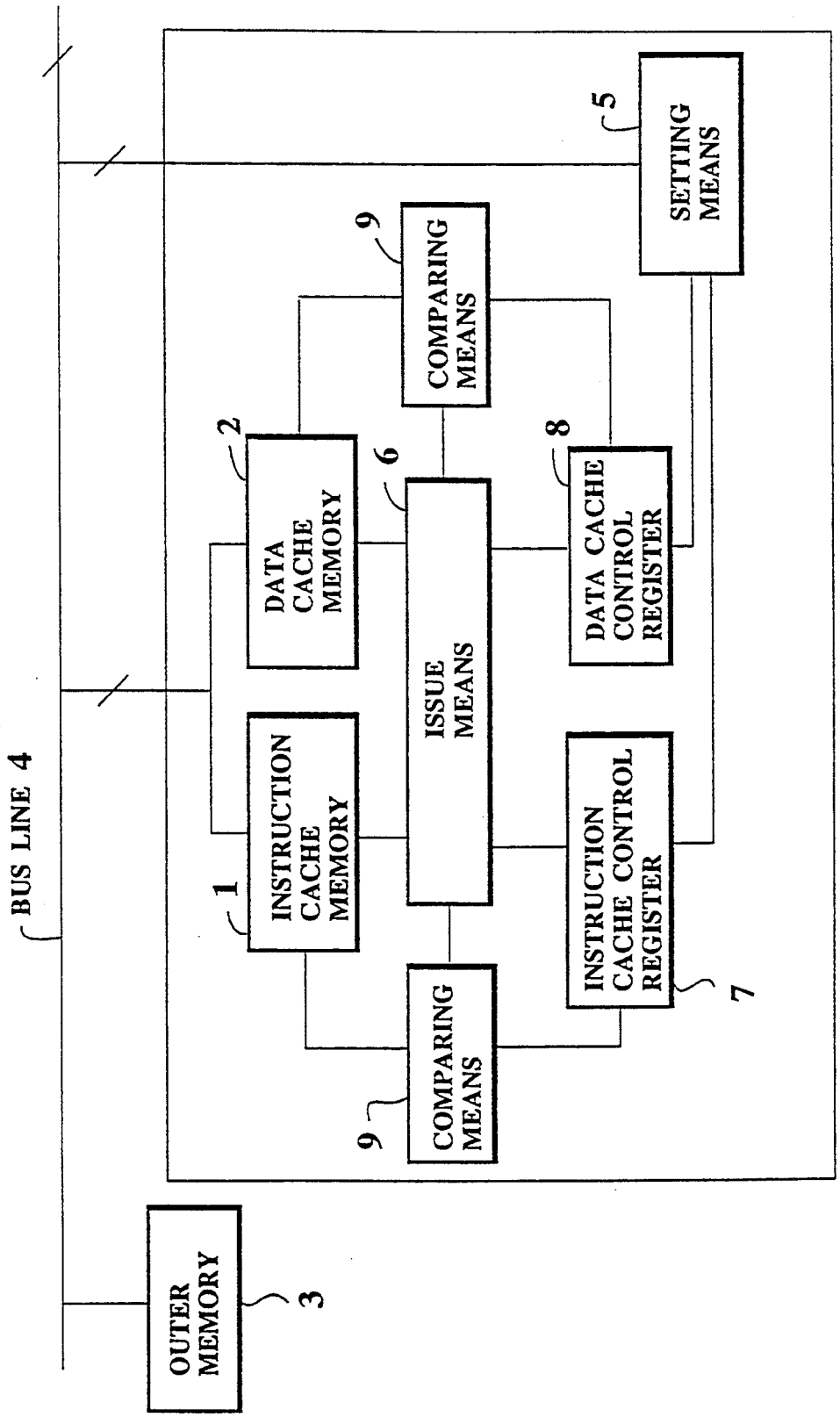
FIG. 1 is a schematic block diagram of a microprocessor including a cache memory of an embodiment according to the present invention.

FIG. 1 shows a schematic block diagram of a microprocessor incorporating cache memories as a first embodiment according to the present invention.

In the same diagram, reference numbers 1 and 2 designate cache memories, each of which is called an instruction cache memory and a data cache memory, respectively.

In this embodiment, these cache memory can be operated by the address per page when a purge operation is required.

Of course, like the conventional various microprocessors, other operations such as writing operation, reading operation and others can be executed per bit, sector, page, or entire location. Instructions and data transferred from the outer memory 3 or others are stored into the instruction cache memory 1 or the data cache memory 2 through bus line 4.

Reference number 5 shows a setting means for setting the purge control information for the purge operation per page of the cache memory 1 or 2 into the instruction cache control register 7 or the data cache control register 8.

Reference number 6 shows an issue means for issuing a command for the purge operation per page into a comparing means in accordance with the purge control information stored in the instruction cache control resister 7 or the data cache control register 8. When all pages in the cache memory 1 or 2 are purged, the issue means transmits directly the command for the purge operation to the cache memory 1 or 2.

Reference number 9 shows a comparing means for comparing a target address for the purge operation stored in the control register 7 or 8 with a page address in the cache memory 1 or 2 so as to transfer a purge control signal as an instruction for the purge operation to the cache memory 1 or 2. When the target address is equal to the page address of the instruction cache memory 1 or the data cache memory 2, the page in the cache memory i or 2 designated by the page address is purged by the instruction based on the command as the purge control signal issued by the issue means.

Hereinafter, operation of the microprocessor having the construction described above will be explained.

First, the purge control information for purging a page of the cache memory 1 or 2 is inputted into the setting means 5 through the bus line 4. The setting means decodes the purge control information so as to judge whether it is an instruction for a purge operation of the instruction cache memory 1 or of the data cache memory 2.

The purge control information is given to the instruction cache control register 7 or the data cache control register 8 by the setting means 5.

Next, the instruction control register 7 or the data cache control register 8 decodes the purge control information and then outputs an instruction command to the issue means.

According to the instruction command, the issue means issues the command into the cache memory 1 or 2 through the comparing means 9 only when the target address set in the instruction control memory or the data cache control register 8 is equal to the address of a page in the cache memory 2.

Then, the purge operation for the instruction cache memory 1 or the data cache memory 2 is executed for the data designated by the page address in accordance with the instruction for the purge operation based on the command issued by means of the issue means. Thereby, the purge operation is finished.

Purge operation in both of the two cache memories 1 and 2 can be executed by the same operation described above.

Additionally, the setting means 5, the instruction cache control register 7, the data cache control register 8, the issuing means, and the comparing means can be controlled by software, for example by a microprogram stored in the microprocessor.

Figure 2:
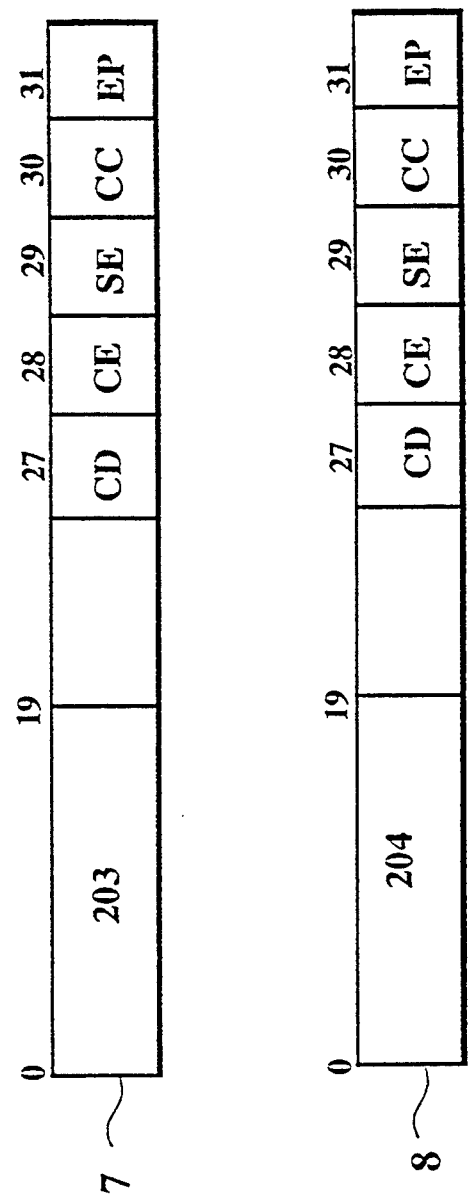
FIG. 2 is a constructional diagram of two control registers, namely an instruction control resister and data cache control resister, used for control of the cache memory as shown in FIG. 1.

FIG. 2 shows a constructional diagram for the purge control information and the purge control data stored in the instruction cache control register 7 and the data cache control register 8 by the setting means 5. In the same diagram, a physical page number is stored into the part designated by the bits of 0 to 19th (the field length is 20 bits), 203 and 204. These two registers 7 and 8 have the same format.

The portion designated by the 27th bit is a cache dump area (CD) so as to dump the content of the cache memories when it is one (1).

The portion designated by the 28th bit is a cache enable area (CE) so as to select whether a purge operation of the cache memories executed or not.

The portion designated by the 29th bit is a snoop enable portion (SE) in order to select whether a snoop processing is executed or not.

The portion designated by the 30th bit is a cache clear portion (CC) so as to select whether the entire cache memory is purged or not.

The portion designated by the 31th bit is an entry purge portion (EP) to select whether an entry in the cache memory is purged or not.

The purge operation for the cache memories 1 and 2 is indicated and then executed by the purge control information having the construction described above.

FIG. 3 is a diagram for comparison among commands in accordance with the control information, and these commands are issued to the cache memories 1 and 2 by the issue means in accordance with the purge control information kept in the control registers 1 and 2 as shown in FIG. 2. In the same diagram, reference character "*" denotes the state of don't care.

As shown in FIG. 3, when the purge operation per page is required for the cache memory, the command 3 is issued by the issue means. When the purge operation for all the pages in the cache memory is selected, the command 2 is chosen by it.

In this manner of the embodiment according to the present invention, the purge operation for the cache memories is executed by using the command based on the purge control information as described above.

Figure 4:
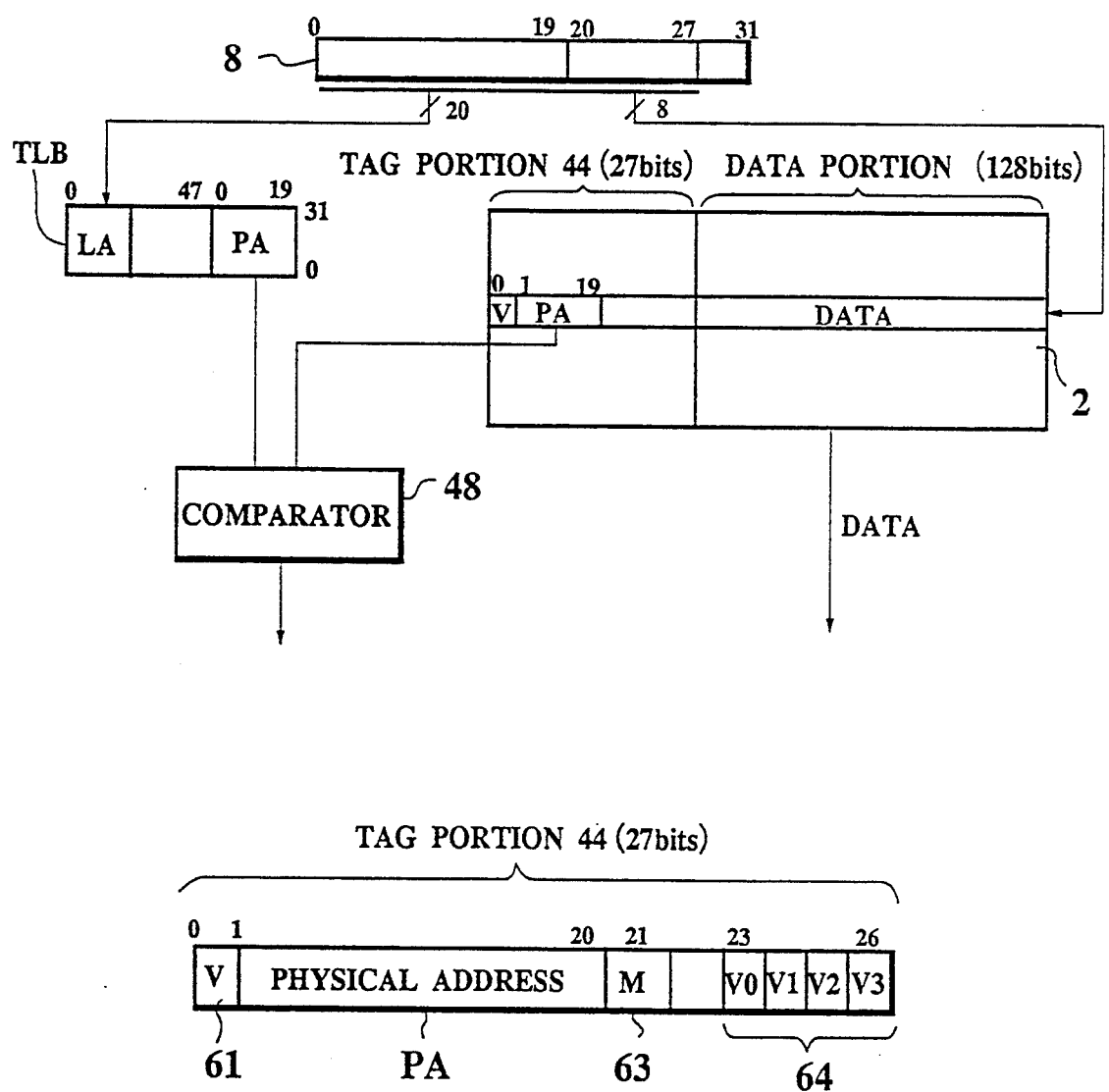
FIG. 4 shows a constructional diagram of a data cache memory incorporated in the microprocessor.

FIG. 4 shows a constructional diagram of a microprocessor, particularly showing the cache memory.

In the same diagram, reference number 8 is a cache control register such as the instruction and data cache control registers 7 and 8 as shown in FIG. 1, reference character "TLB" denotes a Translation Lookaside Buffer. In the TLB, reference character LA is a portion keeping a virtual address used for indirect addressing mode, hereinafter the virtual address is called a "logical address", PA is a portion for storing a physical address as used for direct addressing mode.

Reference number 48 is a comparator for comparing the physical address stored in the TLB with an address per page of the data cache memory 2.

A tag portion 44 of the data cache memory 2 comprises a valid bit 61 or V, a physical address PA, a modified 63 or M, and an effective bit 64 designated by V0, V1, V2, and V3.

The valid bit 61 shows whether data or content of the page designated by the cache control register is effective data or not, namely whether the purge operation for the page may be executed or not. The modified bit 63 is used for indicating to replace the content of the page.

The effective bit 64 is used for indicating the state whether the bit is effective or not, for example about data per byte. But in the embodiment, it is not explained.

Figure 5:
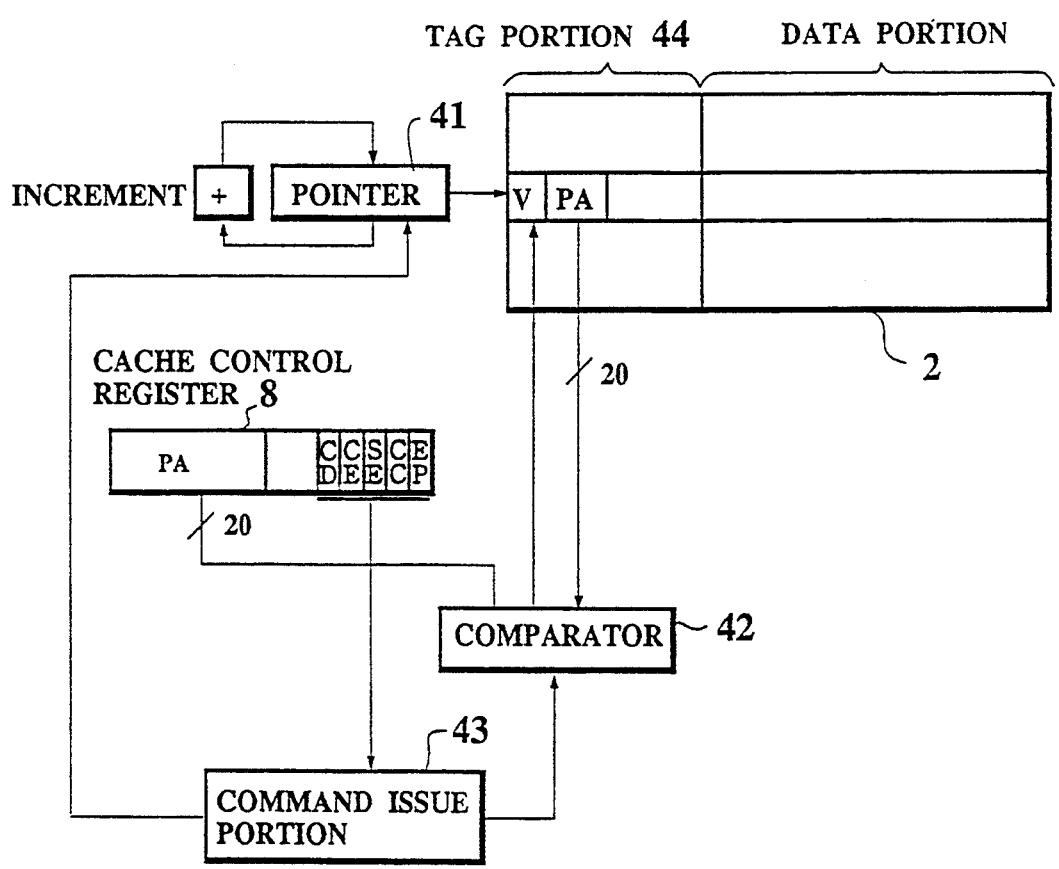
FIG. 5 shows in detail a constructional diagram of a cache memory 2, a control register 8, a command issue portion 43 as an issue means 6, and a comparing means 9 incorporated in the microprocessor as shown in FIG. 1.

FIG. 5 shows in detail a construction diagram of the cache memory 2, the cache control register 8, the command issue portion 43 as the issue means 6, and the comparator 42 according to the microprocessor as shown in FIG. 1. In the following explanation, a case in which the setting means 5 as shown in FIG. 1 indicates a purge operation for the data cache memory will be explained.

First, the setting means 5 (not shown in FIG. 5) sets a purge information per page into the data cache control register 8 for the data cache memory 2. The command issue portion 43 transfers the target address of the purging operation to the comparator 42. The pointer 41 is incremented by one (1) and then the address in the data cache memory 2 designated by the pointer 41 is compared with the address temporarily stored in the comparator 42 by the comparator 42. When the target address agrees with the page address each other, the comparator 42 transmits an address agreement signal to the command issue means 43. Then, the control signal for purging the page indicated by the target address is given into the data cache memory 2. Thereby, the purge operation is completed.

In the embodiment as described above, the purge operation for the data cache memory is explained. In addition, the purge operation for the instruction cache memory can be executed by using the same operation.

Figure 6:
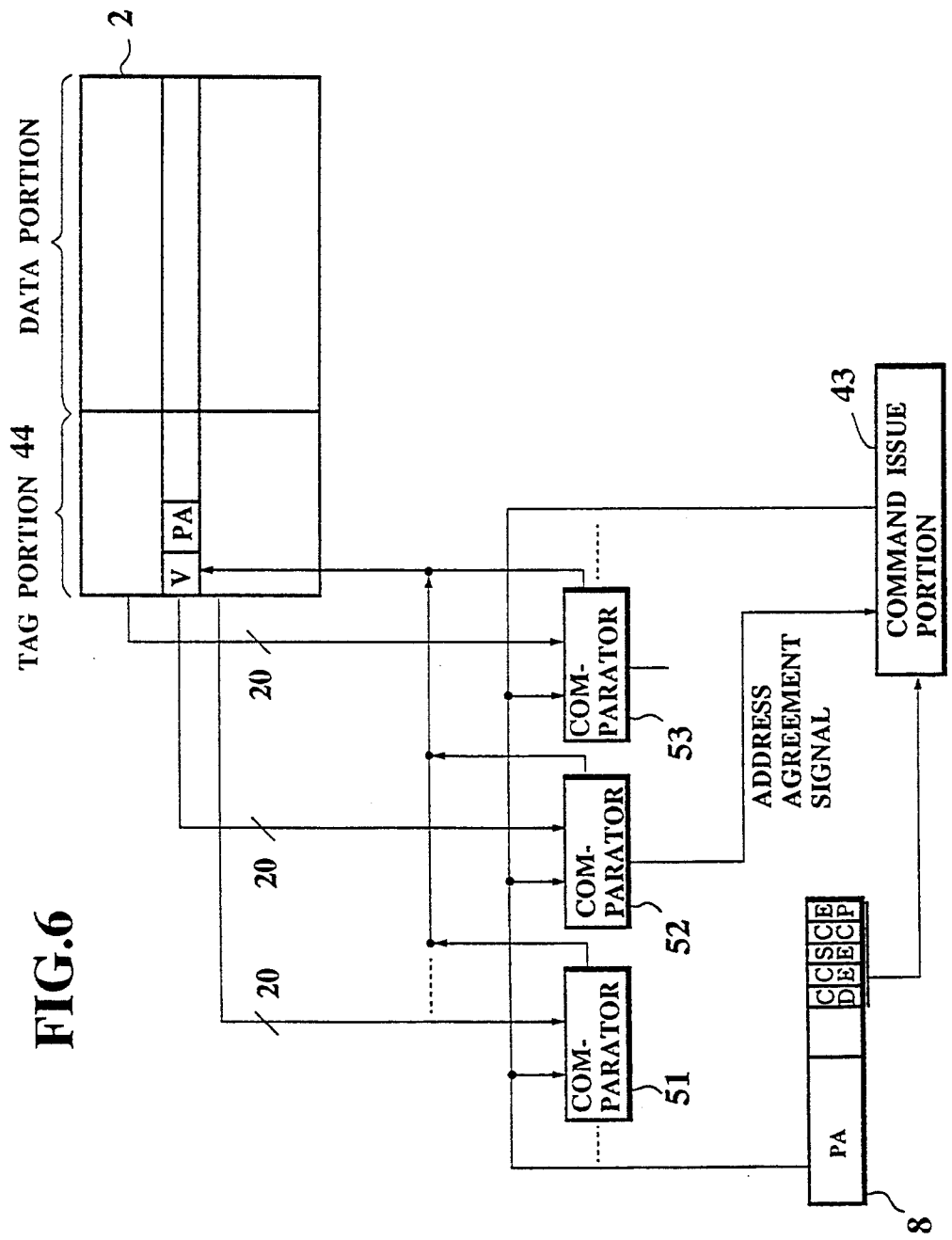
FIG. 6 is a diagram of a microprocessor of another embodiment according to the present invention.

FIG. 6 shows a diagram of a microprocessor of another embodiment according to the present invention.

The construction of FIG. 6 is different from that of the microprocessor as shown with FIG. 5 in added comparators 51, 52, 53 . . . which incorporate each physical address of the data cache memory 2.

The command issue portion 43 receives address agreement signals, each of which indicates information whether the target address agrees with the page address in the data cache memory connected to the comparator or not, applied from comparators 51, 52, 53, . . .

Each comparator transfers the information to the command issuing portion 43.

The pointer 41 used in the embodiment as shown in FIG. 5 therefore may be not used in the present embodiment.

Accordingly, the searching speed of a target address for purging operation is higher than that of the microprocessor as shown in FIG. 5.

In the microprocessors as described above, the command issue portion as the issue means and the comparators as the comparing means are simply added into the conventional microprocessor so that the purge operation per page can be realized.

Moreover, only one comparator is incorporated in the microprocessor as shown in FIG. 5. On the other hand, there is the comparator provided per page constituting the data cache memory in the embodiment as shown in FIG. 6.

However, the present invention is not limited by the above embodiments. For example, the pointer and comparator may be incorporated into every group each of which comprises some pages in the microprocessor so as to obtain a similar effect.

Moreover, in the embodiments, the cache memory comprises the instruction cache memory and the data cache memory. However, this invention is not limited to the embodiments described above. For example, even when the number of the cache memories is only one, we can get the same effect.

Furthermore, in the embodiments, the purge control information has the field of 32 bits. However, the present invention is not limited to the embodiments, we can use a field having a suitable length so as to obtain the same effect.

In addition, when the present invention is applied into a microprocessor having a capacity of cache memory of 4K bytes or more, we can further get the most effective result.

Various modifications will become possible for those skilled in the art with the teachings of the present disclosure without departing from the scope thereof.

What is claimed is:

1. A microprocessor incorporating a cache memory with a selective purge operation for storing data and page addresses, each of said page addresses indicating one of a plurality of pages divided in the cache memory, an instruction decoder means for decoding an instruction transferred externally to the microprocessor, and an execution means for executing the instruction decoded by the instruction decoder means, the microprocessor comprising:

a control register for storing control information including page information indicating said selective purge operation for purging a desired page in the cache memory;

setting means for transferring the control information from the execution means to the control register whenever the control information is set in the instruction decoder means by a load instruction;

comparing means for comparing a page address for the selective purge operation indicated in the control information stored in the control register with a page address in the cache memory; and issue means for providing a purge command to the comparing means to indicate a start of execution of the selective purge operation only when the page address for the selective purge operation is equal to the address indicating the page in the cache memory by the comparing means;

wherein, when the comparing means receives the purge command from the issue means, the comparing means indicates the selective purge operation to the cache memory.

2. A microprocessor according to claim 1, wherein the cache memory comprises an instruction cache memory and a data cache memory.

3. The microprocessor according to claim 2, wherein the comparing means is provided for both the instruction cache memory and the data cache memory.

4. The microprocessor according to claim 2, wherein the comparing means is provided for every page in the instruction cache memory and the data cache memory.

5. The microprocessor according to claim 2, wherein the comparing means is provided for every group of a predetermined number of pages in the instruction cache memory and the data cache memory.

6. The microprocessor according to claim 1, wherein the purge command comprises a cache dump area to dump the data in the cache memory, a cache enable area to select whether the purge operation for the cache memory is executed or not, a snoop enable area to select whether a snoop processing is executed or not, a cache clear portion to select whether the whole contents of the cache memory are purged or not, and an entry purge portion to select whether a page in the cache memory is purged or not.

7. The microprocessor according to claim 6, wherein the control register comprises at least a field to set a physical address, and a field to set the purge command.

* * * * *